Figure 1:
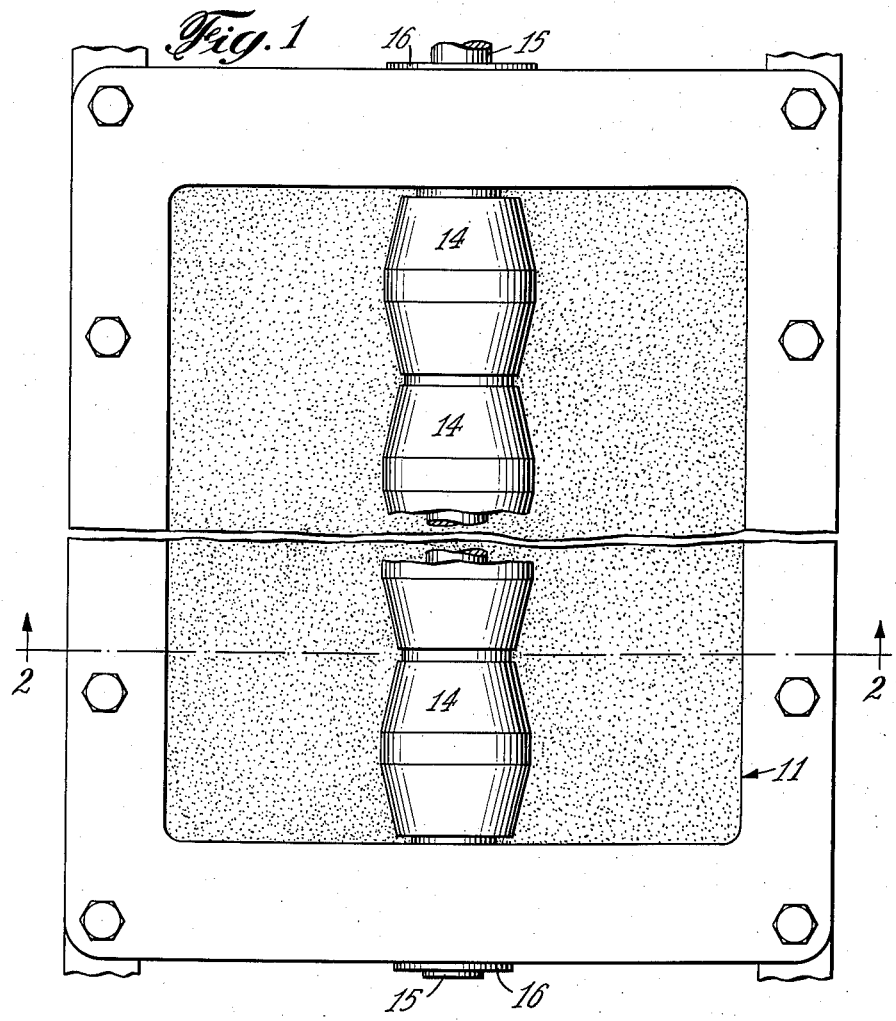

Jan. 17, 1961 W. H. SCHOENFELD, JR 2,968,091
METHOD OF APPLYING SOLDER TO A JOINT
Filed Jan. 29, 1954

INVENTOR.
WILLIAM H. SCHOENFELD, JR
BY Charles H. Cone
Leland R. McCann
George W. Reiber
ATTORNEYS United States Patent Office 2,968,091
Patented Jan. 17, 1961

2,968,091

METHOD OF APPLYING SOLDER TO A JOINT

William H. Schoenfeld, Jr., Glen Ellyn, Ill., assignor to American Can Company, New York, N.Y., a corporation of New Jersey Filed Jan. 29, 1954, Ser. No. 406,966

4 Claims. (Cl. 29—503)

The present invention relates to a novel and improved device for applying molten solder to a metal surface. More specifically the present invention pertains to a solder applying device of a particular alloy composition for the application of a molten soft-solder to metal surfaces to be joined.

By the term "soft-solder" as used herein is meant a low melting point alloy of lead and another low melting point metal soluble in lead, preferably tin or zinc, which is a bonding agent for metals of higher melting points when applied in a molten state to adjacent surfaces of the high melting point metals. By the term "tinning" is meant the process by which a high melting point metal, such as iron or steel, has formed on its surface by the contact of molten tin therewith, a thin layer of a tin-iron intermetallic compound. This thin layer of intermetallic compound formed by the tinning process ranges in composition from substantially pure base metal, for example iron, at the jointure of the ferrous base and the layer, through an alloy of tin and iron, to substantially pure tin at the outer surface of the layer. As used herein, the term "tinning" also refers to a similar process using other low melting point metals in place of tin.

It is well known that lead will not adhere to iron or steel unless the surface of the ferrous metal is first tinned. In adhering to the tinned surface the lead does not adhere to the iron or steel at all but adheres to the thin layer of intermetallic compound covering the surface of the iron or steel. Thus this intermetallic layer acts as a "go-between" or bonding agent for the otherwise incompatible iron and lead.

For the application of soft-solder to the side seam of a metal container, a device similar to that shown in the accompanying drawings (which will be described more fully hereinafter) is used. In such a device the solder applicator comprises a steel roll rotating in a bath of molten solder. With the usual soft-solder containing in the order of 30% by weight of tin, tinning of the steel roll takes place readily and quickly so that this tinned surface is replaced as rapidly as it is worn away by contact with the work. However in an effort to economically reduce the use of tin there have been developed low tin soft-solders containing 5% or less tin and zinc-lead solders in which the zinc content is of necessity no more than about 0.5% by weight of the solder due to the limited solubility of zinc in lead. When attempting to apply these low tin or tin free soft-solders by means of this conventional soldering device, I have found that the quantity of tinning metal is insufficient for rapid tinning of the steel solder rolls and therefore the intermetallic layer is worn away more quickly than it is built up again. With this occurrence great difficulty if not failure is experienced in causing the solder, being predominately lead, to adhere to the steel surfaces of the applicator or rolls thus exposed. This difficulty is especially troublesome in the side seam soldering of sheet metal can bodies where the soldering operation is carried out at high speeds (in excess of 400 cans per minute) and continuously over extended periods of time.

It is therefore an object of the present invention to provide a novel and improved soft-solder applicator or roll.

It is another object of the present invention to provide a solder applicator for tinless or low tin soft-solders which does not become detinned.

A further object of the present invention is to provide a soft-solder applicator useful for the high speed, continuous application of solders having a high proportion of lead and a low proportion of a low-melting, iron-alloying metal such as tin or zinc.

Another object of the invention is the provision of a solder roll for use in high speed, continuous soft-soldering of the side seams of sheet metal can bodies with tinless solders or solders having a low tin content.

Numerous other objects and advantages of the invention will be apparent as it is better understood from the following description, which, taken in connection with the accompanying drawings, discloses a preferred embodiment thereof.

Figure 2:
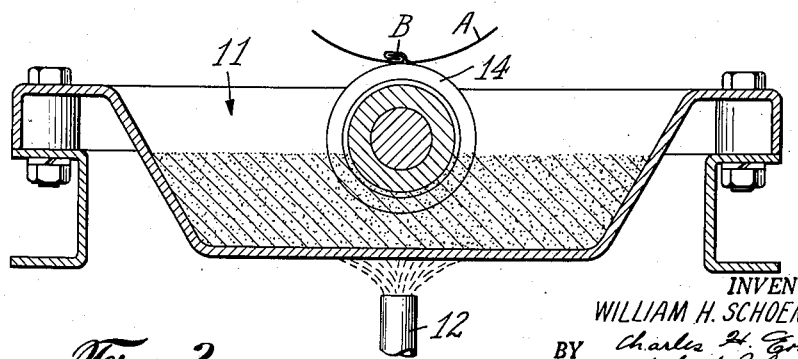

Referring to the drawings:

Figure 1 is a top plan view of one form of apparatus suitable for the utilization of the instant invention, with parts broken away; and Fig. 2 is a transverse sectional view taken substantially along line 2—2 of Fig. 1, the view also showing the side seam of a can body being soldered, parts of the apparatus and the can body being broken away.

In its broadest aspect, the present invention contemplates a soft-solder applicator or roll composed of an alloy the major portion of which is a high melting point metal, i.e. one having a melting point in excess of 1000° C., and the minor portion of which is a low melting point metal, i.e. having a melting point less than 500° C., which latter metal is also a tinning-metal for a lead base soft-solder. The high melting point metals having utility in the instant invention are iron and steel. As low melting point metals, any of the metals usually combined with lead to form a soft-solder are useful, such as arsenic, bismuth, cadmium, tin and zinc. Since in the metal can making art tin-lead and zinc-lead solders are most generally used, tin and zinc are the metals preferred by me for alloying with the iron or steel of the applicator.

This invention is based on my surprising discovery that if the solder applicator, e.g. a solder roll or other soldering device, is composed entirely of an alloy similar to the alloy of the intermetallic compound formed on the surface of iron or steel which has been tinned, the solder applicator does not become detinned regardless of the tinning metal content of the solder and the speed with which the surface of the applicator is worn away by the continuous high speed soldering operation. Thus, when using a soft-solder consisting of lead and a small amount of tin, the solder applicator according to my invention is composed of an alloy of tin and iron; and where zinc is combined with lead to form a soft-solder, the solder applicator is made of a zinc-iron alloy.

The excellent results obtained with the alloy solder applicator of the present invention are quite unexpected and the reasons therefor not completely understood. It is apparently connected with the fact that the alloy composition of the applicator obviates the necessity of building up the intermetallic layer of a tinned iron or steel applicator, which build-up is a very slow process when the concentration of tinning metal is low, i.e. less than 5% by weight of solder. However this fact alone does not completely explain the results obtained, since the composition of the instant applicator differs from that of the intermetallic layer, i.e. the applicator of the present invention is a substantially homogeneous alloy throughout its entirety and does not present a surface of substantially pure tinning metal to a soft-solder to be applied as does the intermetallic layer of a tinned surface which has a varying composition as described above. From past knowledge it would seem that such a film of pure tinning-metal is essential to efficient soldering.

One possible explanation is that due to the solubility of the tinning-metal in lead, some of the tinning-metal in the alloy solder applicator is brought to the surface thereof. Another possibility is that due to the compatibility of the alloy of the solder applicator and the tinning-metal, some of the tinning-metal in the molten solder migrates and adheres to the surface of the applicator. Or it may possibly be that for some unknown reason, the molten soft-solder adheres directly to the alloy of the solder applicator. However since these theoretical considerations are not essential to the invention, I do not wish to be bound thereby.

I have found that the hardness of the solder applicator decreases as the amount of low melting point metal in the alloy increases and that when there is greater than a critical amount of low melting point metal in the alloy, the solder applicator tends to disintegrate by contact with the molten solder and with the work and wears at an excessively fast rate. I have therefore further determined that for efficient, high speed, continuous solder application, the low melting point metal must constitute less than 50% by weight of the alloy. For an alloy solder applicator composed of iron and zinc, the operable range of zinc content is from 20% to 45% by weight, and preferably 30%. For a solder applicator composed of an iron and tin alloy, the operable range of tin content is from 15% to 45% by weight and preferably 30%.

Since some of the low melting point metals boil at temperatures below the melting point of iron and steel and since generally at atmospheric pressure the vapor pressures of the low melting point metals are excessively high at the melting point temperatures of iron and steel, the usual method of alloying by mixing the two metals in a molten state is not practicable. Therefore, to make a satisfactory solid alloy, the well known method of powder metallurgy is preferred by me. This method comprises reducing the two metals to a fine powder, intimately mixing the powders and subjecting the mixture to heat and pressure to diffuse the lower melting point metal uniformly throughout and form an alloy with the higher melting point metal.

The following examples are by way of description of alloy solder applicators encompassed by the present invention and the making thereof and are in no way intended as limitations of the invention:

Example I

Thirty parts by weight of 100 mesh powdered tin are mixed for 1 hour in a ball mill with 70 parts by weight of 300 mesh iron powder. This mixture is placed in a suitable die and given a preheat treatment at 216° C. for ½ hour. The heating is then discontinued and the mixture subjected to a pressure of 25 tons per square inch for 15 minutes after which the resulting composite mass is sintered at a temperature of 760° C. for two hours. The solid metal alloy thus formed is cooled, removed from the die and finished to the desired shape.

The above process may be used to make similar alloys containing 15% and 45% by weight of tin. I have found that satisfactory results can be obtained using combining pressures in the range of about 20 tons to 30 tons per square inch and sintering temperatures in the range of about from 760° C. to 816° C.

Example II

Twenty parts by weight of 200 mesh powdered zinc are intimately mixed by agitation in a ball mill for one hour with 80 parts by weight of 300 mesh powdered iron. The mixed powders are then filled into a suitable die and heated to about 400° C. at which temperature they are held for ½ hour. At this elevated temperature the mixture is subjected to a pressure of 15 tons per square inch for 15 minutes. The mass is then sintered at about 650° C. for two hours after which it is cooled, removed from the die and finished to the desired shape.

Alloys containing 30% and 40% by weight of zinc may be made by the process described in Example II. In this process I have found that compressing the mixed powder with pressures in the range of about from 12.5 tons to 20 tons per square inch at temperatures from room temperature to about 400° C. and sintering at temperatures about from 590° C. to 650° C. produces satisfactory alloys.

In each of the above examples I have found that for larger quantities of powdered metals, longer mixing time for the powders is required to insure a substantially homogeneous mass. Times ranging from 1 hour to 7 hours will produce satisfactory mixtures.

The accompanying drawings illustrate one form of apparatus in which the novel alloy solder applicator of the present invention has utility. This apparatus includes a reservoir 11 (Figs. 1 and 2) for holding a molten solder mixture, e.g. 99.5% lead and 0.5% zinc by weight. This bath of solder is maintained in a molten state at the proper temperature, i.e. 370° C. to 395° C., by a conventional heating element such as a gas burner 12 disposed below the reservoir 11 in such a manner as to project a flame against substantially the whole area of the reservoir bottom.

The molten solder within the reservoir 11 is applied to articles to be soldered, such as the side seam B of a can body A by the solder roll 14 which is of conventional shape. According to the present invention this solder roll is composed of a zinc-iron alloy containing less than 50% by weight of zinc since a zinc-lead solder is being used. However, if the solder were a low tin content solder, e.g. 3% tin and 97% lead by weight, an alloy solder roll composed of a major portion of iron and a minor portion of tin for example the one described under Example I would be used. The solder roll 14 is rotated by suitable means and partially immersed in the bath of molten solder as shown in Fig. 2. The ends of the solder roll preferably are provided with trunnions 15 which are journaled in bearings 16 formed in the frame ends of the reservoir. The solder roll may be rotated in any suitable manner. To receive the solder, the can bodies A preferably are guided and propelled longitudinally along the solder roll 14 with their side seams B in firm engagement with the roll in the usual manner such as disclosed in United States Patent 1,939,723, issued December 19, 1933, to John F. Peters on "Soldering Machine."

Solder applicators made and utilized in the manner described above may be used to effect excellent solder bonds on all types of ferrous metals including tin plate, terne plate and black plate.

The alloy composition described is of course applicable to various forms of soldering devices other than the presently disclosed roll 14.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A method of applying at high speed to a metal joint a soft solder which does not readily adhere to solder applicators composed essentially of iron comprising providing a bath of molten soft solder containing greater than 90% by weight of lead and less than 10% by weight of a metal selected from the group consisting of tin, zinc, arsenic, bismuth, and cadmium, immersing at least a portion of the surface of a solder applicator in said molten solder to provide said surface with a thin adherent layer of said molten solder, said applicator being composed of a solid alloy of a major portion of a metal selected from the group consisting of iron and steel and a minor portion of a metal selected from the group consisting of tin, zinc, arsenic, bismuth, and cadmium, and bringing said joint into contact with said layer of molten solder on said applicator to transfer said molten solder to said joint.

2. A method of applying at high speed to a metal joint a soft solder which does not readily adhere to solder applicators composed essentially of iron comprising providing a bath of molten soft solder containing greater than 90% by weight of lead and less than 10% by weight of a metal selected from the group consisting of tin, zinc, arsenic, bismuth, and cadmium, rotating a solder applicator roller partially submerged in said molten solder to continuously provide the surface of said roller with a thin adherent film of said molten solder, said roller being composed of a solid alloy of a major portion of a metal selected from the group consisting of iron and steel and a minor portion of a metal selected from the group consisting of tin, zinc, arsenic, bismuth, and cadmium, and bringing said joint into contact with said molten solder on said roller to transfer said molten solder from said roller to said joint.

3. The method set forth in claim 2 wherein said soft solder contains at least 95% by weight of lead, the remainder of said soft solder being tin, and said applicator roller is composed of a solid alloy of substantially 70 parts by weight of iron and substantially 30 parts by weight of tin.

4. The method set forth in claim 2 wherein said soft solder contains at least 99.5% by weight of lead, the remainder of said solder being zinc, and said applicator is composed of a solid alloy of substantially 80 parts by weight of iron and substantially 20 parts by weight of zinc.

References Cited in the file of this patent

UNITED STATES PATENTS

| | | |
|---|---|---|
| 22,711 | Dennis | Jan. 25, 1859 |
| 1,200,272 | Taylor | Oct. 3, 1916 |
| 1,667,618 | Abbott | Apr. 24, 1928 |
| 1,760,519 | Palmer | May 27, 1930 |
| 1,785,762 | Bundy | Dec. 23, 1930 |
| 1,938,630 | Kuula | Dec. 12, 1933 |
| 2,042,635 | Schellens | June 2, 1936 |
| 2,116,562 | Cruser | May 10, 1938 |
| 2,192,792 | Kurtz | Mar. 5, 1940 |
| 2,313,227 | De Bats | Mar. 9, 1943 |
| 2,401,483 | Hensel | June 4, 1946 |
| 2,667,138 | Maher | Jan. 26, 1954 |
| 2,679,223 | Franklin | May 23, 1954 |
| 2,690,005 | Schoenfeld et al. | Sept. 28, 1954 |

FOREIGN PATENTS

| | | |
|---|---|---|
| 578,936 | Great Britain | July 17, 1946 |

OTHER REFERENCES

Metals Handbook, 1939 Edition, p. 1746. Published by the American Society for Metals, Cleveland, Ohio.